United States Patent [19]

Yan et al.

[11] Patent Number: 5,544,479
[45] Date of Patent: Aug. 13, 1996

[54] DUAL BRAYTON-CYCLE GAS TURBINE POWER PLANT UTILIZING A CIRCULATING PRESSURIZED FLUIDIZED BED COMBUSTOR

[75] Inventors: Xinglong Yan, Cambridge; Lawrence M. Lidsky, Newton, both of Mass.

[73] Assignee: Longmark Power International, Inc., Cambridge, Mass.

[21] Appl. No.: 230,338

[22] Filed: Apr. 20, 1994

Related U.S. Application Data

[63] Continuation-in-part of Ser. No. 194,726, Feb. 10, 1994.
[51] Int. Cl.[6] .................. F02C 1/10; F02C 3/26; F02C 6/00
[52] U.S. Cl. ................ 60/39.183; 60/39.464
[58] Field of Search .................. 60/39.183, 39.464

[56] References Cited

U.S. PATENT DOCUMENTS

| | | | |
|---|---|---|---|
| 3,503,205 | 3/1970 | Suter | 60/36 |
| 3,503,206 | 3/1970 | Strub | 60/36 |
| 3,635,019 | 1/1972 | Kronogard et al. | 60/39.16 |
| 3,791,137 | 2/1974 | Jubb et al. | 60/39.18 R |
| 3,871,172 | 3/1975 | Villiers-Fisher et al. | 60/39.02 |
| 3,913,315 | 10/1975 | Skinner | 60/39.18 R |
| 3,924,402 | 12/1975 | Harboe | 60/39.18 C |
| 4,037,413 | 7/1977 | Heller et al. | 60/655 |
| 4,086,758 | 5/1978 | Harboe | 60/39.02 |
| 4,116,005 | 9/1978 | Willyoung | 60/655 |
| 4,164,846 | 8/1979 | Moskowitz et al. | 60/39.46 S |
| 4,223,529 | 9/1980 | Willyoung | 60/39.18 A |
| 4,253,300 | 3/1981 | Willyoung | 60/39.18 B |
| 4,261,166 | 4/1981 | Mayrhofer | 60/39.02 |
| 4,261,167 | 4/1981 | Paull et al. | 60/39.02 |
| 4,315,400 | 2/1982 | Cole et al. | 60/39.02 |
| 4,406,128 | 9/1983 | Fanaritis et al. | 60/655 |
| 4,470,254 | 9/1984 | Chen et al. | 60/39.02 |
| 4,503,681 | 3/1985 | Willyoung et al. | 60/655 |
| 4,660,375 | 4/1987 | Hyde et al. | 60/39.03 |
| 4,677,307 | 6/1987 | Vadas et al. | 290/2 |
| 4,729,217 | 3/1988 | Kehlhofer | 60/39.02 |
| 4,802,445 | 2/1989 | Robertson, Jr. | 122/4 D |
| 4,827,723 | 5/1989 | Engström et al. | 60/683 |
| 4,841,727 | 6/1989 | Wittchow et al. | 60/39.484 |
| 4,955,190 | 9/1990 | Robertson, Jr. | 60/39.02 |
| 5,197,277 | 3/1993 | Ishigami et al. | 60/39.12 |
| 5,203,159 | 4/1993 | Koizumi et al. | 60/39.484 |
| 5,212,941 | 5/1993 | Croonenbrock et al. | 60/39.02 |
| 5,218,815 | 6/1993 | Korenberg | 60/39.05 |
| 5,236,354 | 8/1993 | Goldback et al. | 60/39.02 |

OTHER PUBLICATIONS

D. L. Bonk, B. Tarrant, D. Horazak, "Application of PFBC's In Rural Locations", Fluidized Bed Combustion, vol. 2, ASME, 1993, pp. 1153–1162.

X. L. Yan, L. M. Lidsky., "Design of Closed–Cycle Helium Turbine Nuclear Power Plants", The Americal Society of Mechanical Engineers, International Gas Turbine and Aeroengine Congress & Expo., May 24–27, 1993, pp. 1–8.

*Primary Examiner*—Richard A. Bertsch
*Assistant Examiner*—William Wicker
*Attorney, Agent, or Firm*—Weingarten, Schurgin, Gagnebin & Hayes

[57] ABSTRACT

A gas turbine power plant operating on a dual Brayton cycle and utilizing a circulating pressurized fluidized bed combustor is disclosed. An open Brayton cycle is provided in which the hot flue gas from the fluidized bed combustor is expanded to extract work to drive compressors to supply combustion air for the fluidized bed combustor and to drive an electric generator to produce electricity. The residual heat of the flue gas exhausted from the open Brayton cycle can be utilized for heat cogeneration at high power-to-heat ratios. A closed Brayton cycle is also provided, the working medium of which is heated in an indirect heater of the circulating pressurized fluidized bed combustor and expanded to extract work to drive another electric generator. The air supplied by the open Brayton cycle is also used to fluidize the heated particles in the indirect heater. The power plant is capable of burning a wide variety of fuels, operating over a broad size range, and minimizing pollution while providing highly efficient, low cost electric power and heat production.

67 Claims, 8 Drawing Sheets

DUAL BRAYTON-CYCLE GAS TURBINE POWER PLANT UTILIZING A CIRCULATING PRESSURIZED FLUIDIZED BED COMBUSTOR

RELATED APPLICATION

This application is a continuation-in-part of U.S. patent application Ser. No. 08/194,726, filed on Feb. 10, 1994.

FIELD OF THE INVENTION

This invention relates to power plants, and more particularly relates to a dual Brayton-cycle gas turbine power plant.

BACKGROUND OF THE INVENTION

There are important economic and environmental benefits associated with an increase in the efficiency of electric power plants. It is particularly desirable to have such efficient power plants capable of burning a wide range of fuels with minimal pollution. Another highly desirable feature is the ability to function economically over a wide range of sizes because some of the renewable (biomass) fuels are most suited to small power plants while other fuels, such as coal and natural gas, are better suited to large power stations. While many of these features have been achieved by existing power plants, the quest for efficiency has resulted in highly complex power plants which are economical only in large sizes and do not have the flexibility to burn multiple fuels.

Pressurized fluidized bed combustion is a known method for clean fuel burning, particularly for burning solid fuels. It provides the ability to capture fuel contaminants such as sulfur in most coals through chemical reaction with sorbents added during combustion. The pressurized fluidized bed further maintains combustion temperatures within the range at which the contaminants can be effectively absorbed and the formation of toxic nitrogen oxides can be limited. Fluidized bed combustion is thus able to provide environmentally acceptable emissions for the combustion of most fuels.

A pressurized fluidized bed combustor can be of either the circulating or bubbling type. A number of differences exist between the two types. First, the circulating bed operates at higher fluidizing velocities than the bubbling bed, so that the combustor can be more compact, leading to easier feeding and better distribution of fuel, and of sorbent if needed. Because the circulating combustor is smaller, modular construction and factory assembly become feasible, which lowers capital cost. Second, the circulating combustor enables simpler load following through controlling the recirculation rate of bed material without the need to transfer bed material to and from additional bed material storage vessels as required by the bubbling bed. Finally, the circulating combustor uses an external heat exchanger, located outside the harsh environment of the combustion bed, whereas the bubbling bed uses in-bed heat exchanging equipment.

The circulating pressurized fluidized bed combustor has been used for power generation in combined cycles coupling a simple open Brayton-cycle gas turbine with a Rankine-cycle steam turbine. Although the Brayton cycle is relatively efficient in power conversion, the overall efficiency of such plants is limited by the low thermal efficiency of the Rankine cycle because of the large latent heat loss during the steam condensation phase of the steam turbine power cycle.

To improve combined cycle efficiency, advanced designs use very high excess air, higher combustion pressure, and higher gas turbine inlet temperature to increase the thermal load ratio of the gas turbine to the steam turbine and to increase the efficiency of the gas turbine cycle. To obtain higher turbine temperature, a second combustor of conventional type is provided to further heat the flue gas exhausted from the fluidized bed before it enters the gas turbine. The overall plant efficiency of such advanced combined cycles is improved, but remains limited by the low efficiency of the Rankine-cycle steam turbine. Another longstanding problem in combined cycle power plants is the presence of economies of scale. Because of the complexity of steam turbines and their associated equipment, steam turbines are economical only in relatively large size. This problem has seriously limited the commercial value of combined cycle power plants for such applications as independent power production or biomass plants that require small power output units.

A power conversion cycle without a steam turbine can be a solution to the problems facing the prior art fluidized bed combustor power plants. One approach is disclosed in U.S. Pat. No. 3,791,137, in which a power conversion cycle based on an open-cycle gas turbine and a closed-cycle helium turbine is used with a bubbling pressurized fluidized bed combustor. However, several significant technical and economic difficulties arise with this design, impeding its commercial feasibility. First, the heat exchanger which serves as the indirect heater for the closed-cycle helium turbine must be positioned within the combustion bed of the bubbling bed. Consequently, the heater outer surface (the combustion side) is attacked by the corrosive and erosive environment in the combustion bed. Furthermore, the helium flow of the closed Brayton-cycle gas turbine must be heated in the heater to a high temperature close to that of the bed combustion in order to obtain high thermal efficiency for the closed-cycle helium turbine. This results in very high temperatures for the heater material, accelerating the corrosive and erosive attack on the heater material. In such conditions, it is difficult for conventional, economic materials to provide an adequate lifetime for the heater. Second, the combustor must operate at a relatively low pressure, e.g., about six times atmospheric pressure. Higher pressures would result in reduced system thermal efficiency because of the lack of an effective means for controlling stack loss at higher pressures. The design given in U.S. Pat. No. 3,791,137 is thus unable to take advantage of the fact that higher pressures for combustion have the effect of reducing the size and thus the cost of the combustor and of lowering the pressure load and stress imposed on the construction material of the heater. Third, the overall cycle efficiency is limited by the requirement of the low temperature combustion in the fluidized bed for effective emission control. Finally, there are difficulties in mechanical and aerodynamic designs for helium turbines for small power plants with an electric output of about 20 megawatts. Designers have been unable to design relatively inexpensive small helium turbine prototypes, adversely affecting the use of closed-cycle helium turbines.

SUMMARY OF THE INVENTION

The present invention overcomes the above difficulties by providing a circulating pressurized fluidized bed combustor power plant based on a dual Brayton-cycle gas turbine comprising an open Brayton-cycle gas turbine and a closed Brayton-cycle gas turbine. A circulating pressurized fluidized bed combustor is used to heat the working medium for the open-cycle gas turbine. An indirect heater provided with the circulating pressurized fluidized bed combustor is used to heat the working medium on the closed cycle. The indirect heater is located outside the fluidized bed combustor, which frees the heater material from combustion-related corrosion and erosion, permitting conventional economic materials to be used for the heater construction with adequate operational lifetime. The simplicity and low cost of the gas turbine equipment help reduce high capital costs and improve scale economies associated with prior art circulating pressurized fluidized bed combustor-based power plants.

The working medium in the closed-cycle gas turbine is preferably either helium or a helium mixture with one or more other heavier gases such as neon, nitrogen, or carbon dioxide, although other working media such as air, nitrogen, or carbon dioxide may be used if desired. Providing a variety of possible working media ensures the technical feasibility of the present power plant over a broad power range to cover a variety of commercial applications.

The present invention allows for cycle intercooling and heat recuperation in both the open- and closed-cycle gas turbines to provide efficient cycle power conversion and to facilitate the design and performance optimization of the circulating pressurized fluidized bed combustor. The high efficiency yields a competitive cost of electricity and reduces pollution.

In a further embodiment of the present invention, the open-cycle gas turbine includes an additional combustor for burning a fluid fuel, such as oil or natural gas. A gasifier may also be used to provide other fuel gases produced from solid fuels. In this manner, the inlet temperature of the gas turbine need no longer be limited by the low fluidized bed combustion temperature. It can be raised through the second combustor to higher temperatures to take advantage of state-of-the-art gas turbine technology, so that the overall efficiency of the plant can be considerably increased.

In another further embodiment of the present invention, a heat cogeneration system is incorporated to allow heat cogeneration at high power-to-heat generating ratios from the exhaust heat of the open-cycle gas turbine and from the heat extracted from cooling the plant cycles and equipment. Also, the heat cogeneration system may be used to produce steam, which can be injected into the open-cycle gas turbine to significantly increase the cycle power capacity and efficiency.

DESCRIPTION OF THE DRAWINGS

The invention will be more fully understood from the following detailed description taken in conjunction with the accompanying drawings in which.

DETAILED DESCRIPTION OF THE INVENTION

Figure 1:
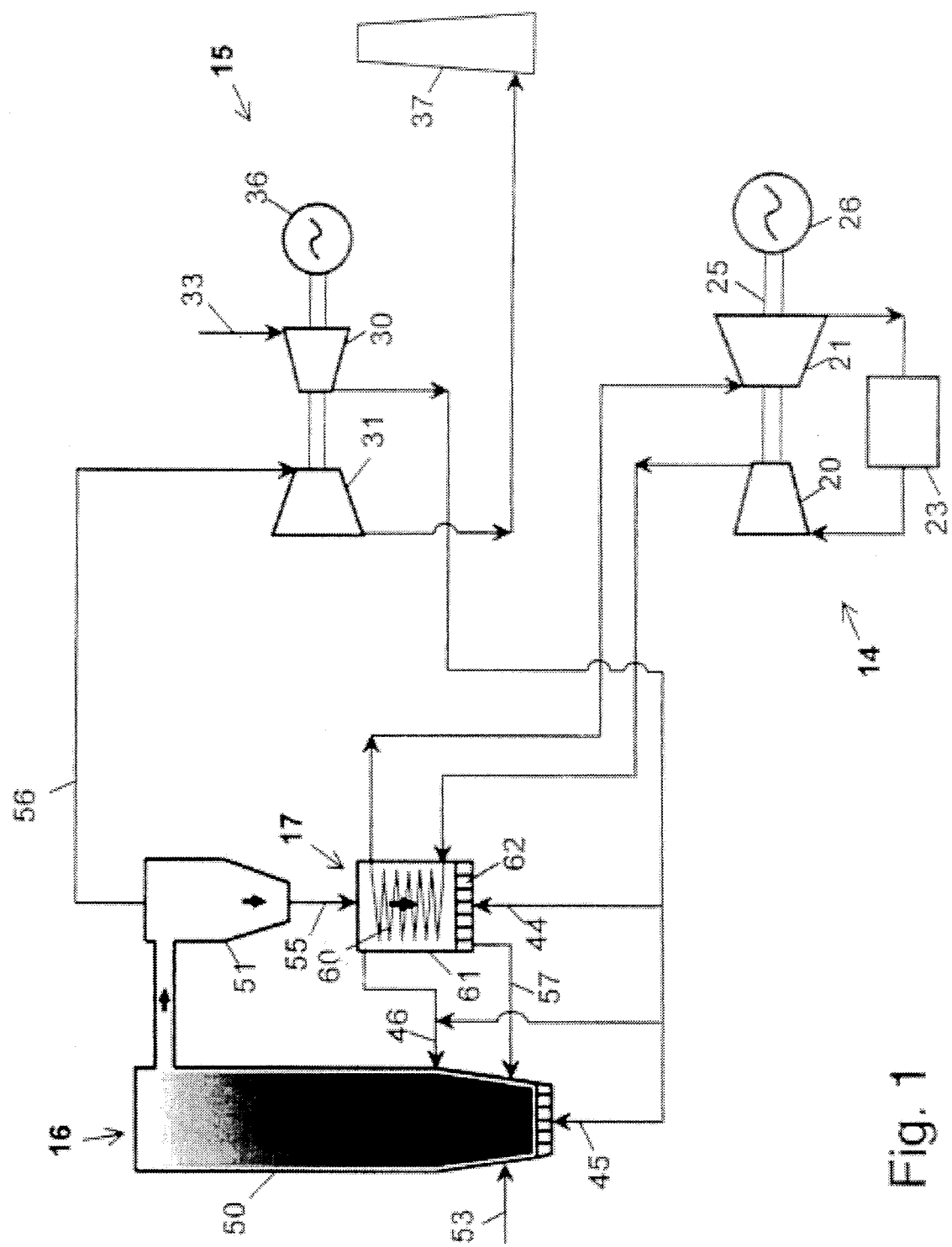
FIG. 1 is a schematic view of a dual Brayton-cycle gas turbine power plant with a circulating pressurized fluidized bed combustor in accordance with the present invention.

The power plant of the present invention is shown generally in FIG. 1. The power plant comprises a closed Brayton-cycle gas turbine system 14, an open Brayton-cycle gas turbine system 15, a circulating pressurized fluidized bed combustor 16, and an indirect heater 17.

Fuel is fed into the fluidized bed combustor 16 for combustion to heat solid particles in the combustor bed and to produce hot flue gas. The heated solid particles are circulated from the combustor via the flue gas stream into the indirect heater 17 and back to the combustor. The fluidized bed combustor and indirect heater may be of any suitable type, as is known in the art. In the indirect heater, the particles are used to provide heat input to the closed-cycle gas turbine system 14, which converts the heat into electricity through an electric generator 26. The sensible heat of the hot flue gas is utilized by the open-cycle gas turbine system 15 to extract work to supply compressed combustion air for the fluidized bed combustor and to drive another electric generator 36 to produce electricity. Total system efficiencies of up to 50 percent can be achieved.

Figure 2:
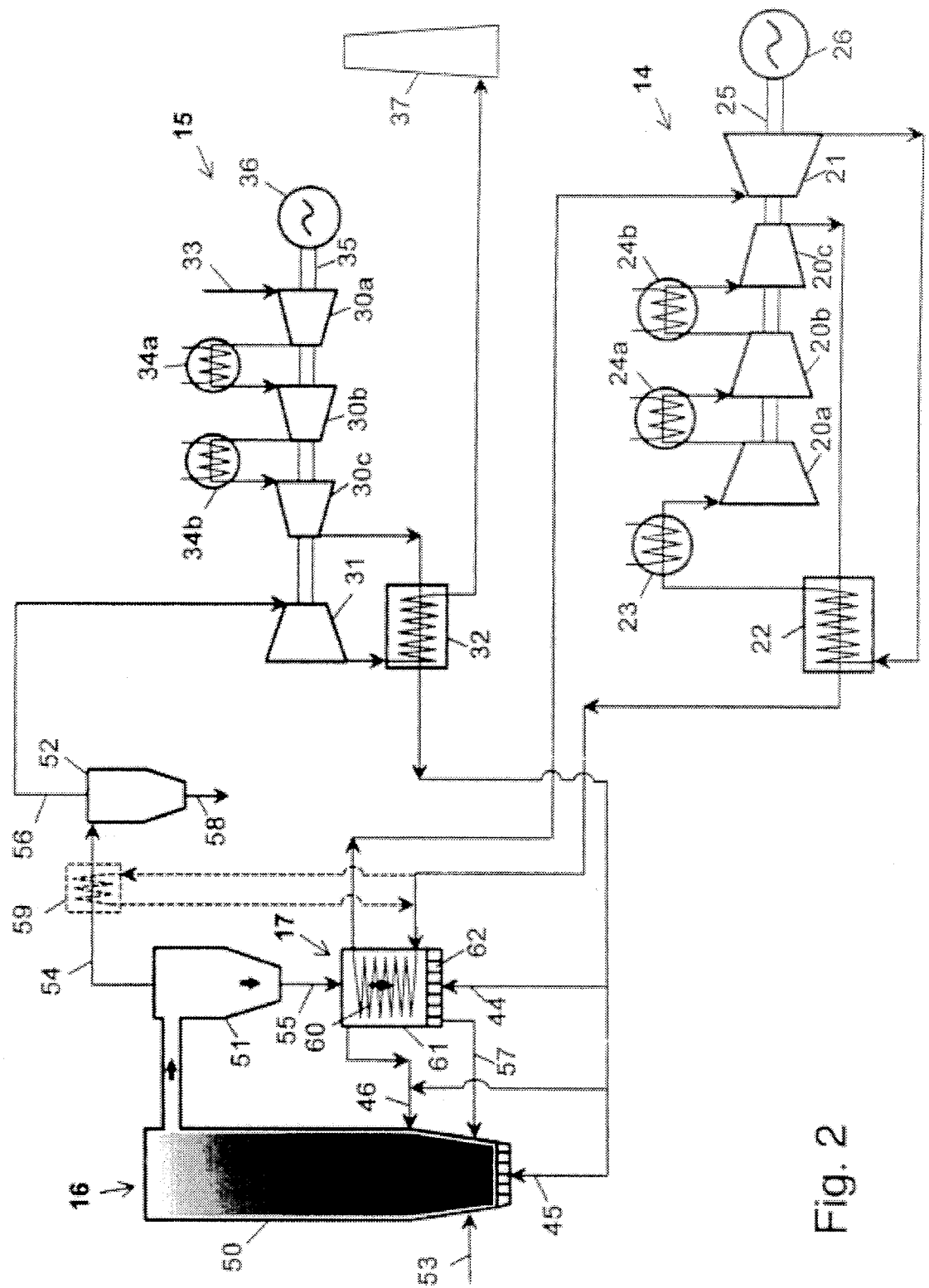
FIG. 2 is a schematic view of an intercooled, heat recuperated dual Brayton-cycle gas turbine power plant with a circulating pressurized fluidized bed combustor in accordance with the present invention.

More specifically, the closed Brayton-cycle gas turbine system 14 comprises a compressor 20, a gas turbine 21, a cooler 23, and an electric generator 26. The system operates in a closed loop with a predetermined working gas. The working fluid is heated to a high temperature via a heat exchanger 60 embedded in the indirect heater 17. Preferably, the closed Brayton cycle incorporates cycle intercooling and heat recuperation, as shown in FIG. 2. In this case, the system comprises a low-pressure compressor 20a, an intercooler 24a, an intermediate-pressure compressor 20b, another intercooler 24b, a high-pressure compressor 20c, a recuperator 22, and a precooler 23, in addition to the gas turbine 21 and electric generator 26. The gas is first compressed in the low-pressure compressor and directed to intercooler 24a, where the heat resulting from the preceding compression is extracted. The cooled gas is then more efficiently compressed again in the intermediate-pressure compressor 20b, followed by another heat extraction in intercooler 24b and then by another compression in the high-pressure compressor. Any suitable numbers of compressors and intercooling stages may be provided. The cycle intercooling permits use of very high pressurization, for example, up to 30 atm, for the combustion system, to facilitate system design optimization while avoiding significant penalty in the thermal efficiency of the combustion system.

The compressed gas exiting the high-pressure compressor flows into one side of recuperator 22 to be heated through heat transfer by the gas turbine exhaust gas that passes the other side of the recuperator. The warm gas is then directed into heater 17 to be heated to a high temperature. Leaving the heater, the hot gas flows into the gas turbine 21 for expansion to produce shaft power to drive the three compressors and the electric generator on a shaft 25. Exhaust gas from the turbine passes the recuperator 22 to transfer remaining heat back to the cycle, after which it is cooled in precooler 23 and then fed into the low-pressure compressor 20a to start next cycle process.

Because of the closed-loop operation, the closed-cycle gas turbine system can be pressurized to reduce the size of the cycle equipment. Although air, nitrogen or carbon dioxide can all be used as a working medium for the system, helium is preferred owing to its many advantageous thermodynamic properties. The high sonic speed of helium eases the Mach number limit on aerodynamic design for the turbine and compressor. The large specific heat and the high thermal conductivity of helium in combination with the system pressurization result in high cycle power density and small heat transfer equipment, all of which reduce plant cost. However, the helium gas turbine of small plants with power output below about 20 megawatts can begin encountering mechanical and aerodynamic design problems including excess tip clearance loss and rotor instability. In such cases, other gases identified above or a helium mixture with gases of heavier molecular weight such as neon, nitrogen or carbon dioxide can be used to circumvent the design problems for small closed-cycle gas turbines.

The open Brayton-cycle gas turbine system 15 as shown in FIG. 1 comprises a compressor 30, a combustion turbine 31, and an electric generator 36. Preferably, as shown in FIG. 2, the open Brayton cycle also incorporates intercooling and heat recuperation. In this case, the system comprises a low-pressure compressor 30a, an intercooler 34a, an intermediate-pressure compressor 30b, another intercooler 34b, a high-pressure compressor 30c, and a recuperator 32, in addition to the combustion turbine 31 and electric generator 36. If desired, a common generator could be used for both the open-cycle and the closed-cycle gas turbine systems, rather than using separate generators for each cycle.

The cycle process of the open-cycle gas turbine system begins with the air being drawn through an air intake 33 into the cycle to begin sequential compression in the three compressors. Similar to the closed-cycle process, intercoolers 34a and 34b provide air intercooling between two adjacent compressors to allow more efficient compression. Any suitable numbers of compressors and intercooling stages may be provided. In addition, the intercooling maintains the final compressed air leaving compressor 30c at a temperature low enough to ensure efficient heat recovery of flue gas in the recuperator 32, which can greatly reduce stack loss and thus substantially increase combustor thermal efficiency. The air leaving the recuperator is then partially directed through a nozzle 44 into heater 17 as the heater fluidizing air and partially fed into the fluidized bed combustor through nozzles 45 and 46 as primary and secondary combustion airs, respectively. The hot flue gas from the combustor is cleaned and then directed into combustion turbine 31 for expansion to produce shaft power to drive the three compressors and electric generator 36 on a shaft 35. After exiting the turbine, exhaust gas enters the recuperator to return remaining heat back to the cycle before it flows to a stack 37 for emission into the atmosphere.

The circulating pressurized fluidized bed combustor 16 as shown schematically in FIG. 1 comprises a combustion bed 50 and a solid-gas separating cyclone 51. A flue gas cleanup filter 52 may also be provided, as shown in FIG. 2. In operation, the combustor 50 is fueled with either solid, gaseous, or liquid fuel through a corresponding fuel feeding device 53. Dirty fuel that contains contaminants such as sulfur may be fed together with a sorbent capable of capturing the contaminants through chemical reaction during ensuing combustion. The combustion temperature in the combustion bed is maintained within the range in which contaminants can be effectively absorbed and emission pollutants such as sulfur and nitrogen oxides can be adequately limited. Flue gas from the combustion bed is separated in the cyclone 51 from entrained solid particles and may be further cleaned of remaining particulate matters in the flue gas cleanup filter 52 if necessary before it is sent to combustion turbine 31 through a pipe 56. The hot solid particles collected in the cyclone are sent to heater 17 for heating the closed-cycle gas turbine system and then recirculated back from the heater into the combustion bed at controlled flow rates through a controlling pipeline 57. The control for solid recirculation rates is used to regulate the combustion temperature of the combustion bed and the heating duty of the heater during load followings. The particulate matters filtered off the flue gas in the filter is removed from the filter through an outlet pipe 58 for further cooling and disposal.

Filter 52 may be omitted, as shown in FIG. 1, if the particulate loading in the flue gas exiting cyclone 51 is low enough that no danger of excess corrosion, erosion, or fouling is imposed in the downstream equipment. On the other hand, if alkali vapor exists in the flue gas entering the combustion turbine 31 at a high level unacceptable to the combustion turbine operation, an optional flue gas cooler 59 (depicted in dashed lines in FIG. 2) may be installed upstream of the filter 52 to condense the alkali vapor in the flue gas to allow the removal of the alkali as alkali condensates by the filter. In this case, part or all of the closed-cycle cold gas stream leaving the recuperator 22 and flowing toward the heater 17 may first be passed through the flue gas cooler 59 to cool the flue gas through a heat exchanger before it is directed into the heater.

Indirect heater 17 receives the solid particles through an inlet pipe 55 from the cyclone into an enclosure 61. The sensible heat of the solid particles is transferred to the gas flow of the closed-cycle gas turbine system through a heat exchanger 60 immersed in the solid particles. The air supplied from the open-cycle gas turbine enters through nozzle 44 into an air plenum-distributor 62 and is injected into the enclosure 61 to fluidize the solid particles to facilitate the convective heat transfer of the heater. The air leaving the heater is fed into the combustion bed through nozzle 46 as secondary combustion air. The solid particles are removed from the heater and return into the combustion bed through pipeline 57 near the heater bottom.

Figure 3:
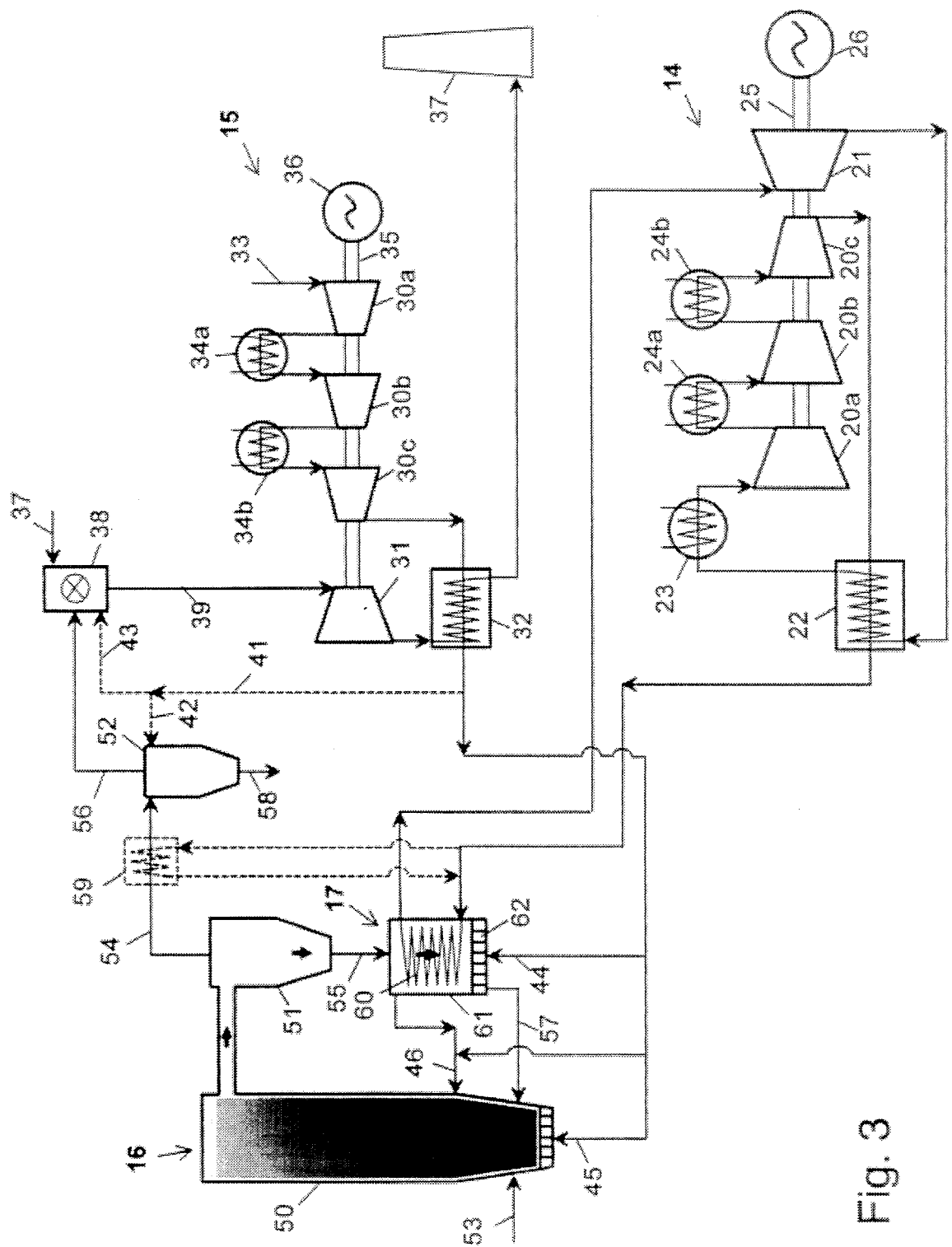
FIG. 3 is a schematic view of the power plant of FIG. 2 with an additional gas turbine combustor fueled by fluid fuel, in accordance with an alternate embodiment of the present invention.

FIG. 3 is a schematic of an alternate embodiment of the present invention wherein the parts that are similar to those of FIGS. 1 and 2 have been designated by the same reference numerals and will not be described in detail. As shown in FIG. 3, a second combustor 38 fueled with gaseous or liquid fuel through a fuel feeder 37 has been added. The relatively low fluidized bed combustion temperature that is required for emission control results in a low inlet temperature and thus lower efficiency for the open-cycle gas turbine. The added combustor 38 enables the flue gas of the fluidized bed combustor to be heated to a significantly higher temperature to fully exploit the state-of-the-art capabilities of the gas turbine. The flue gas from the combustor 38 at an increased temperature is then sent through a pipe 39 to the combustion turbine 31 for highly efficient cycle power conversion. In addition, the combustor 38 can also be used alone to maintain partial power operation with the open-cycle gas turbine during the downtime of the fluidized bed combustor or the closed-cycle gas turbine system. Additionally or alternatively, the combustor 38 can be used as a startup burner during the startup operation of the plant.

The combustion air needed for combustor 38 may be supplied by the vitiated air from the fluidized bed combustor, which is fed with high excess air. An additional or alternative route for supplying the combustion air to the combustor 38 is to divert a partial flow of the air leaving the recuperator 32 into a pipe 41 (shown by a dashed line in FIG. 3) and feed it into the combustor through an air feeder 43 (shown by a dashed line). When cooling is desired for the flue gas cleanup operation of filter 52, part or all of the air stream flowing in the pipe 41 can be first directed into the filter 52 through a nozzle 42 (also shown by a dashed line) to cool the flue gas entering the filter by direct mixing or cooling through a heat exchanger, and then sent into the combustor through the pipe 56.

Figure 4:
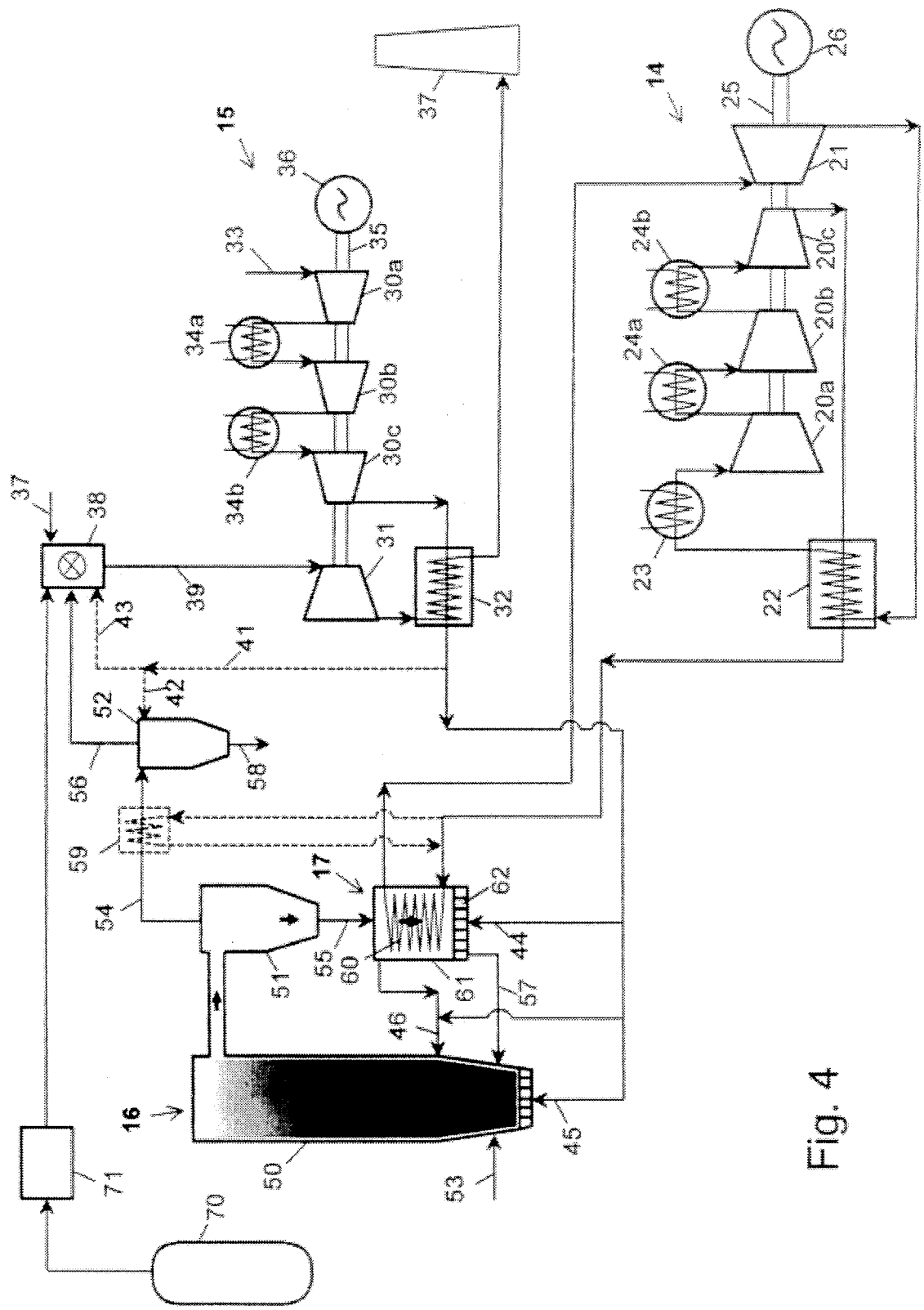
FIG. 4 is a schematic view of the power plant of FIG. 3 with the addition of a solid-fuel gasifier for producing a clean fuel gas to fuel the gas turbine combustor in accordance with another alternate embodiment of the present invention.

FIG. 4 shows another embodiment of the invention in which a pressurized solid-fuel gasifier 70 is added to the embodiment of FIG. 3 and is used to produce clean fuel gas to fuel combustor 38. Those parts of FIG. 4 that are previously identified in the embodiments of FIGS. 1 through 3 are given the same numerals and will not be described again. Solid fuel is burned substoichiometrically to produce hot, low-heating-value fuel gas, which is then cleaned in a hot gas cleanup device 71 and fed into the combustor 38. Similar to the previous fluidized bed combustion, sorbent can be injected with the solid fuel into the gasifier to chemically absorb the contaminants if they exist in the fuel. Depending on its operation principles, the gasifier may produce char residue, which can be burned in the fluidized bed combustor. Furthermore, the gasification process in the gasifier may be supported by either air, oxygen, or water, or by their combinations. In the air-based gasification, the compressed air from the open-cycle gas turbine can be used. In cases where oxygen or water is needed, additional equipment will be required for its preparation and supply to the gasifier.

Figure 5:
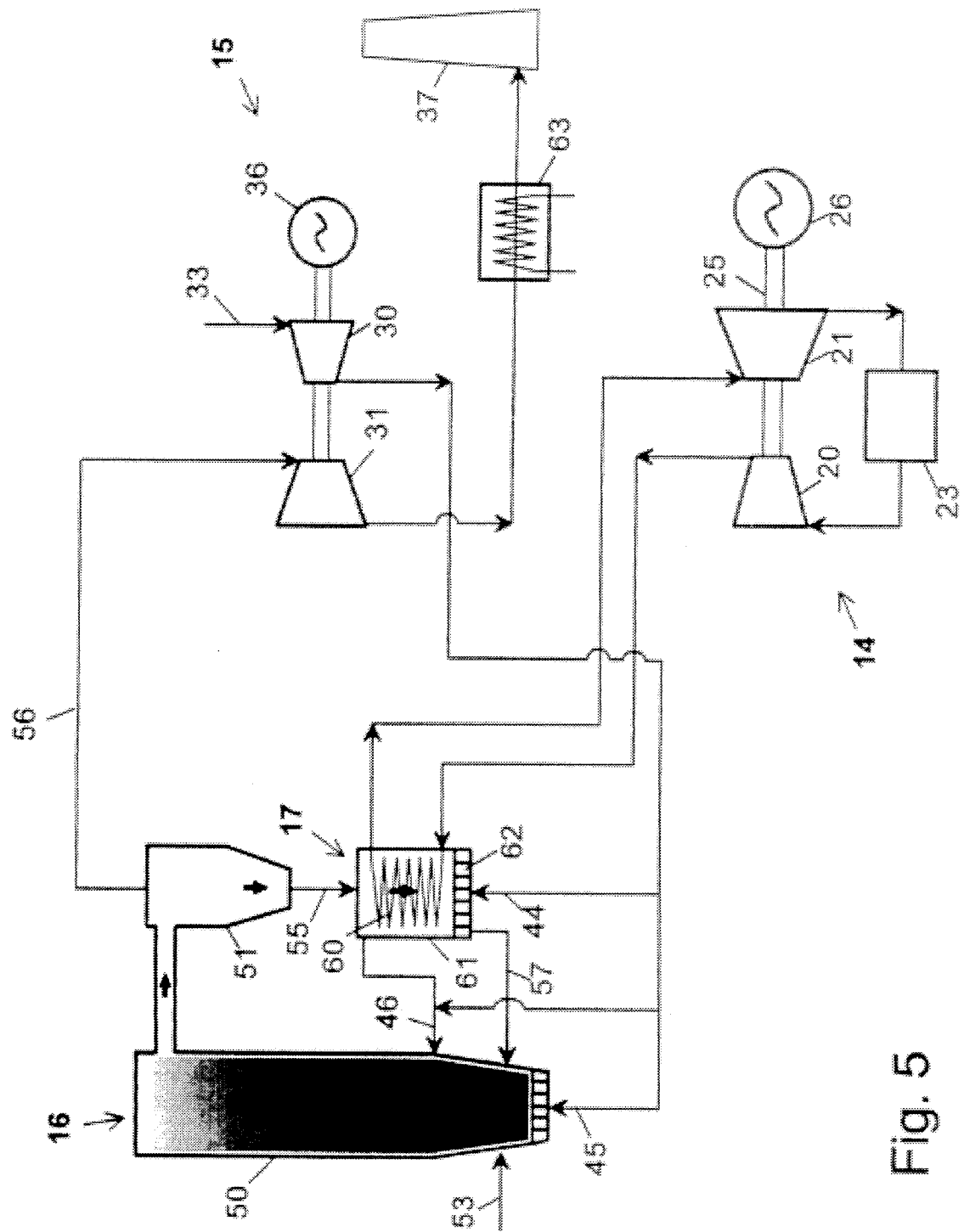
FIG. 5 is a schematic view of the power plant of FIG. 1 with the addition of a heat recovery system for heat cogeneration in accordance with an alternate embodiment of the present invention.

FIG. 5 shows another embodiment of the invention in which a heat recovery system 63 is added to the embodiment of FIG. 1 for heat cogeneration from the residual heat of the turbine exhaust gas of the open-cycle gas turbine. Those parts of FIG. 5 that are previously identified in the embodiment of FIG. 1 are given the same numerals and will not be described again. After exiting the turbine 31, the turbine exhaust gas enters the heat recovery system for heat cogeneration from its residual heat and then flows to a stack 37 for emission into atmosphere. The heat generated in the heat recovery system may be utilized for, but not be limited to, such applications as district heating and cooling and low-temperature process heat. Because of the ability for the fluidized bed combustor to burn fuel at low temperature with a wide range of excess combustion air, various power-to-heat cogeneration ratios can be realized to satisfy particular cogeneration needs.

Figure 6:
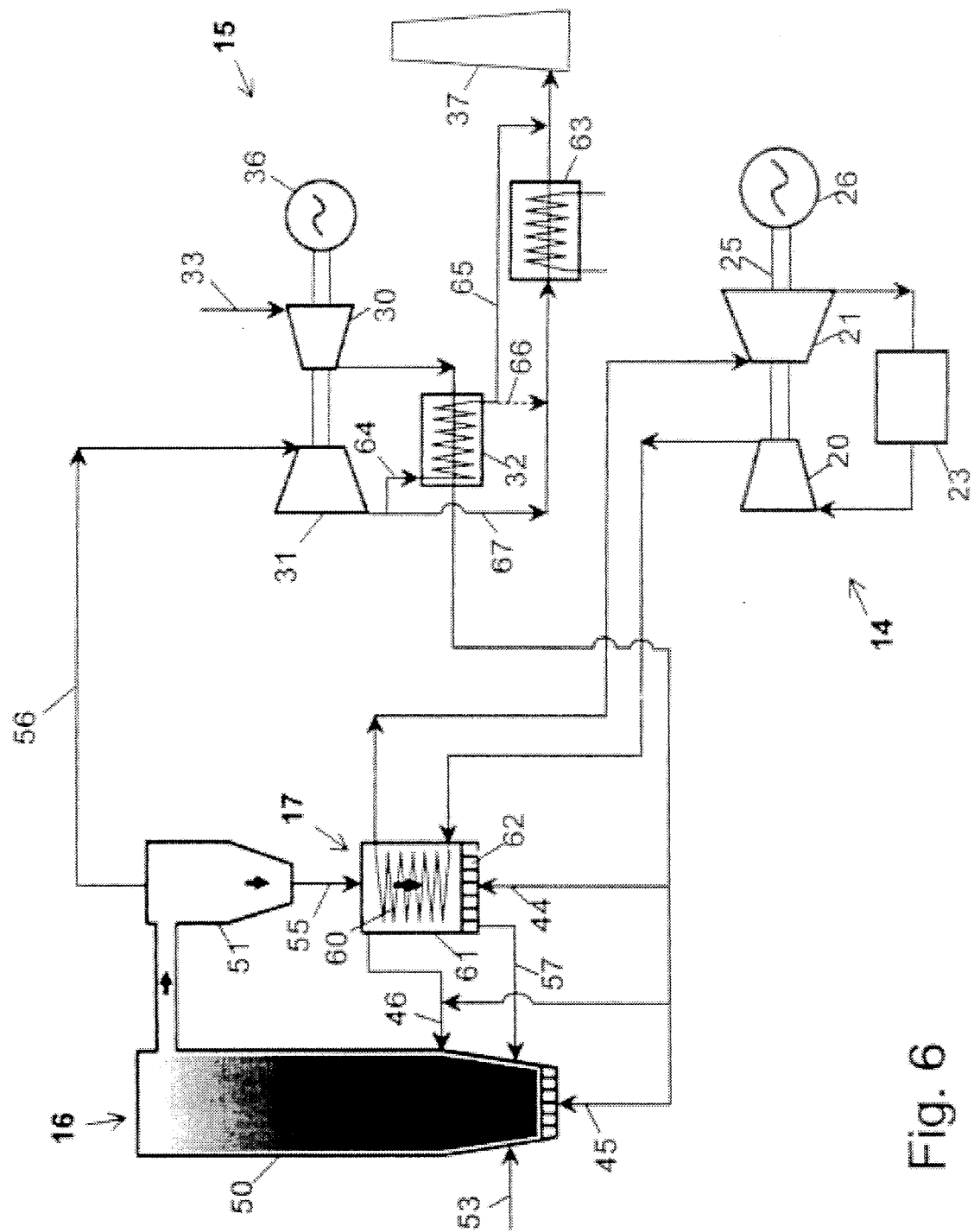
FIG. 6 is a schematic view of the power plant of FIG. 5 with the addition of a recuperator for regulating heat recuperation and cogeneration in accordance with another alternate embodiment of the present invention.

FIG. 6 is a schematic of an alternate embodiment of the present invention wherein the parts that are similar to those of FIGS. 1 to 5 have been designated by the same reference numerals and will not be described in detail. As shown in FIG. 6, the recuperator 32 is used to join the heat recovery system 63 in recovering the residual heat of the exhaust gas from the turbine 31 and to provide a means for regulating heat generation. The heat generation rates may thus be regulated by leading the turbine exhaust gas partially or completely to bypass the heat recovery system 63 and to flow via a duct 64 into one side of the recuperator 32, in which the exhaust gas transfers its residual heat to the compressed air flowing in the other side of the recuperator. The flue gas leaving the recuperator 32 may then be sent in a duct 65 to the stack 37 for emission into atmosphere. Additionally or alternatively, part or all of the flue gas leaving the recuperator 32 may be directed in a duct 66 (shown by a dashed line) into the heat recovery system 63 to allow further waste heat recovery or to control the temperature of the heat recovery system by mixing with the relatively hotter flue gas coming directly from the exhaust of turbine 31 in a duct 67. Suitable valving and valving control systems, as are known in the art, may be provided to direct the flue gas as desired to the recuperator 32 and the heat recovery system 63.

Although the above heat cogeneration methods are generally illustrated using the embodiments of FIGS. 5 and 6 as an example, they can be similarly applied in the other embodiments of the present invention based on the principles of the illustrated methods.

Figure 7:
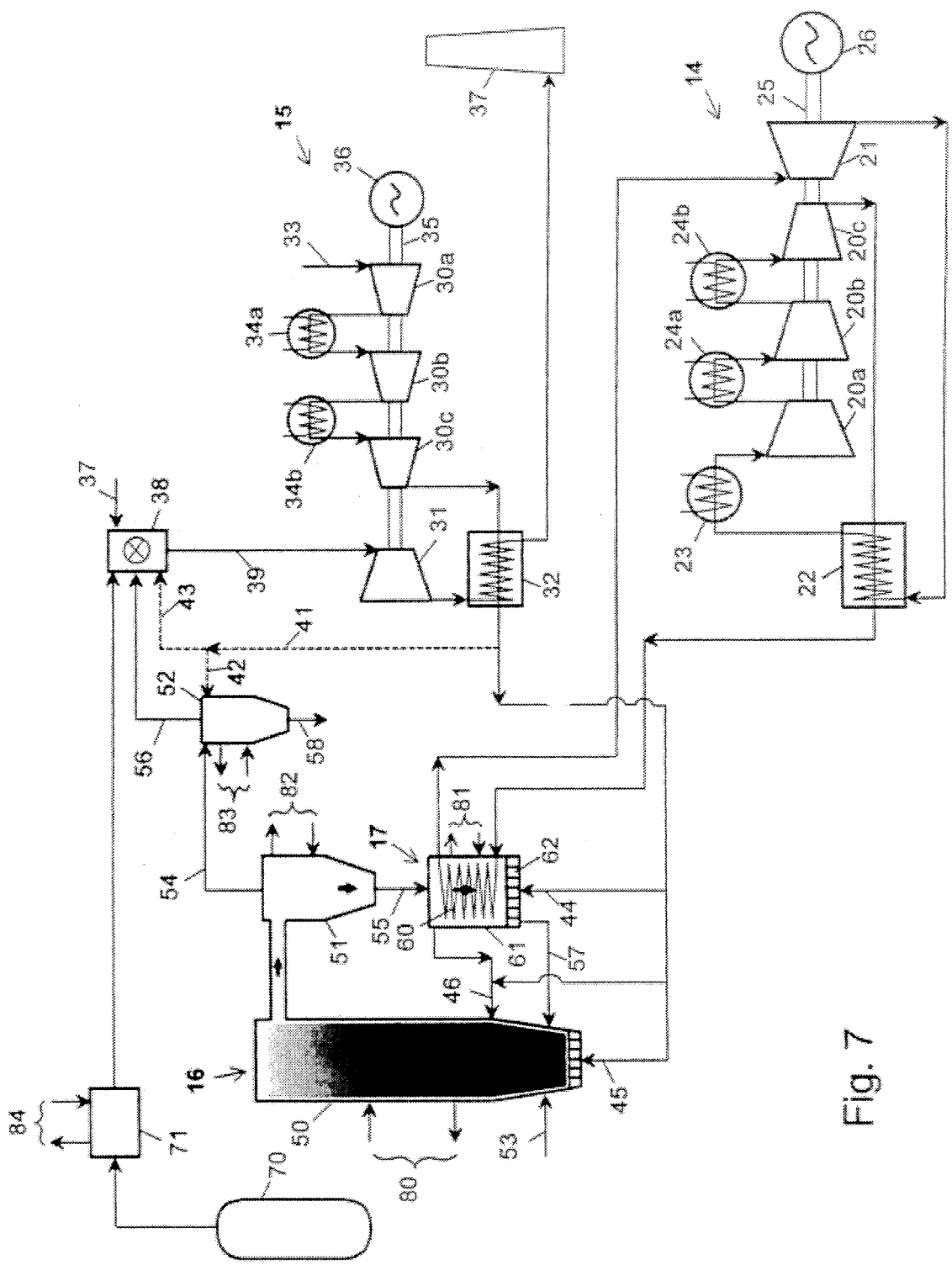
FIG. 7 is a schematic view of a dual Brayton-cycle gas turbine power plant illustrating various heat cogeneration systems.

Additional heat cogeneration may be provided by suitable heat cogeneration systems to utilize the heat extracted from the various intercoolers 24a, 24b, 34a, 34b, and precooler 23, and to further recover the waste heat of the stack flue gas in stack 37. Also, if cooling on the structural walls of the fluidized bed combustor 16 or the indirect heater 17 is required for lowering the wall operating temperature, the heat extracted from such cooling may be utilized by a suitable heat cogeneration system, indicated schematically in FIG. 7 by arrows 80 for the fluidized bed combustor 16 and arrows 81 for the indirect heater 17. Similarly, cooling of the structural walls of the solid-gas separating cyclone 51, the flue gas cleanup filter 52, and the fuel gas cleanup device 71, may be utilized in suitable heat cogeneration systems, indicated schematically in FIG. 7 by arrows 82, 83 and 84 respectively. In like manner, the heat removed from the flue gas stream in the flue gas cooler 59 (shown in FIGS. 2 to 4) may also be utilized by a suitable heat cogeneration system. In this case, the working medium of the closed cycle need no longer be used as a coolant in the flue gas cooler as shown in FIGS. 2 to 4. In practical operation of a plant, such heat cogeneration systems provided at the various locations in the plant may operate independently or cooperatively so as to provide desired heat cogeneration characteristics, such as heat flow quantity and temperature, and to satisfy particular design constraints, as is known in the art.

Figure 8:
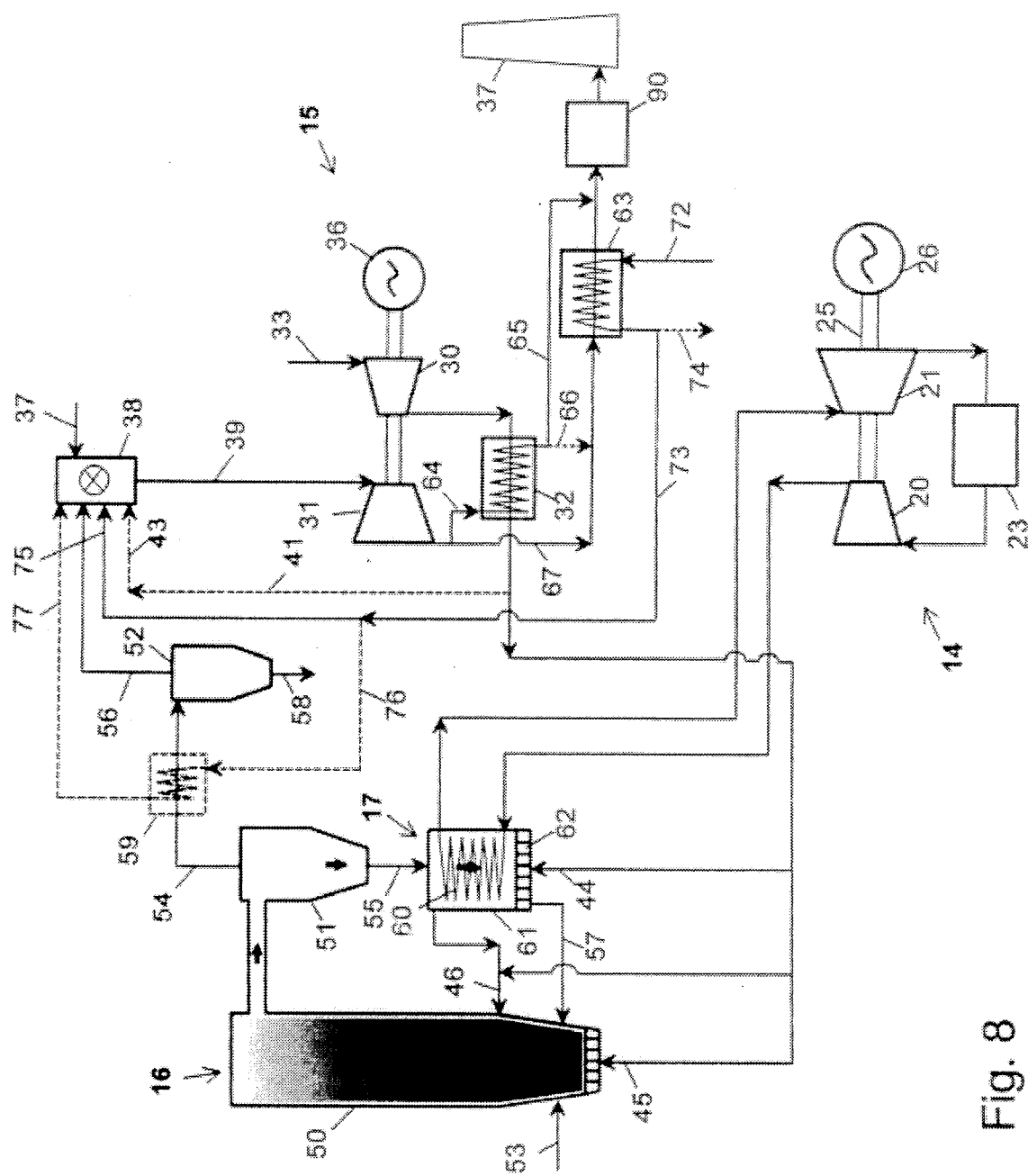
FIG. 8 is a schematic view of a dual Brayton-cycle gas turbine power plant with steam injection in the open-cycle gas turbine in accordance with the present invention.

FIG. 8 shows a further embodiment of the present invention incorporating the injection of steam into the open-cycle gas turbine to increase the cycle power capacity and efficiency. Parts that have been previously identified in the embodiments of FIGS. 1 through 7 have been given the same reference numerals and will not be described again. The injected steam may be provided through heat cogeneration by any of the various heat cogeneration systems described previously. As an example, one particular system arrangement for steam production and injection is illustrated in FIG. 8; similar arrangements may be provided for other heat cogeneration systems. As shown in FIG. 8, purified water is pumped via an inlet 72 into the heat recovery system 63 where the water is heated by the exhaust heat of the open-cycle gas turbine into low-temperature steam. Part or all of the steam output from the heat recovery system is directed via a pipe 73 to the combustor 38 and injected into the combustor through a nozzle 75 while remaining steam produced in the heat recovery system is output through a pipe 74 (shown by a dashed line) as low-temperature process steam of the heat cogeneration. Part or all of the steam in the pipe 73 may be first directed via a pipe 76 (shown by a dashed line) into the flue gas cooler 59 to be heated further by the hot flue gas stream to a higher temperature before it is injected into the combustor 38 through a nozzle 77 (shown also by a dashed line). Because the steam injected into the combustor 38 provides additional mass in the flue gas stream exiting the combustor, more power can be produced in the turbine 31 through the expansion of the increased turbine mass flow. To reduce water consumption, suitable equipment 90 can be employed to recover and treat the water content in the turbine exhaust for reuse in the steam injection cycle after adequate cleaning of the recovered water to remove acids and particulates resulting from the combustion process.

The foregoing descriptions of the specific embodiments of the present invention have been presented for purposes of illustration and description. These embodiments have been so formed and described as to best explain the principles and practical applications of the invention in order to enable others skilled in the art to best utilize the invention in various possible forms as are suited to the particular use contemplated. They should not be construed as limiting the scope of the invention to the precise forms described, and in fact many modifications and variations are possible in light of the above teaching. For example, many modifications can be made in both open-cycle and closed-cycle gas turbine systems, including use of different numbers of turbines and compressors and corresponding number of intercoolers, use of various rotor arrangements and shaft configurations, use of a common generator driven by both open- and closed-cycle gas turbines, and incorporation of different power frequency conversion methods and equipment if needed. Likewise, variations also exist for the combustion system and the cleanup systems for flue and fuel gases. Thus the scope of the present invention should be determined by the following claims and their legal equivalents.

We claim:

1. A power plant comprising:
   a circulating pressurized fluidized bed combustor having an outlet for a flue gas stream;
   an indirect heater in communication with said fluidized bed combustor for receiving solid particles from said outlet of said fluidized bed combustor;
   first piping connected to said outlet of said fluidized bed combustor and said indirect heater for directing the solid particles from said outlet of said fluidized bed combustor to said indirect heater;
   second piping connected to an outlet of said indirect heater and said fluidized bed combustor for returning solid particles to said fluidized bed combustor;
   a heat exchanger located in said indirect heater for heat transfer from solid particles in said indirect heater;
   a closed-cycle gas turbine comprising:
      a compressor, a turbine, and a generator connected on a common shaft, and
      a closed piping system for circulating a first working fluid through said closed-cycle gas turbine, said closed piping system further comprising a piping section located for directing the working fluid downstream of said compressor to said heat exchanger in said indirect heater and for returning the first working fluid to said turbine, whereby the first working fluid on said piping section is heated by heat transfer from the solid particles in said indirect heater; and
   an open-cycle gas turbine comprising:
      a compressor, a turbine, and a generator connected on a common shaft, and
      an open piping system comprising:
         a first section in fluid communication with said fluidized bed combustor for circulating the flue gas stream from said fluidized bed combustor to said turbine for expansion, and
         a second section for circulating a second working fluid to said compressor and said indirect heater to fluidize the solid particles in said indirect heater and for directing said second working fluid to said fluidized bed combustor.

2. The power plant of claim 1 wherein the second working fluid comprises air.

3. The power plant of claim 1 wherein the first working fluid comprises helium, air, nitrogen, carbon dioxide, or a mixture comprising helium and at least one gas of a heavier molecular weight.

4. The power plant of claim 1 wherein said closed-cycle gas turbine further comprises a recuperator disposed along said piping section of said closed piping system to direct the first working fluid from said compressor in heat exchange relationship with the first working fluid from said gas turbine to heat the first working fluid from the compressor prior to directing the first working fluid to said heat exchanger in said indirect heater.

5. The power plant of claim 1 wherein said second section of said open piping system of said open-cycle gas turbine further comprises a conduit for directing the second working fluid to said fluidized bed combustor downstream of said indirect heater.

6. The power plant of claim 1 wherein said second section of said open piping system of said open-cycle gas turbine further comprises conduits for staging the introduction of said second working fluid to said fluidized bed combustor to reduce emissions of nitrogen and sulfur oxides in the flue gas stream.

7. The power plant of claim 1 wherein said open-cycle gas turbine further comprises a flue gas cleanup filter located upstream of said turbine on said first piping section of said open piping system.

8. The power plant of claim 1 wherein said closed-cycle gas turbine further comprises multiple shafts, each shaft having a turbine connected thereto.

9. The power plant of claim 1 wherein said open-cycle gas turbine further comprises multiple shafts, each shaft having a turbine connected thereto.

10. The power plant of claim 1 further comprising a heat recovery system located downstream of said turbine on said first piping system of said open piping system whereby the flue gas stream from said turbine is directed to said heat recovery system for heat cogeneration from the flue gas stream.

11. The power plant of claim 1 wherein said generator of said closed-cycle gas turbine and said generator of said open-cycle gas turbine further comprise a common electric generator driven together by said open-cycle gas turbine and said closed-cycle gas turbine.

12. The power plant of claim 1 further comprising a heat cogeneration system in heat exchange relationship with walls of said fluidized bed combustor to provide cooling to the walls and to utilize heat extracted from the cooling for heat cogeneration.

13. The power plant of claim 1 further comprising a heat cogeneration system in heat exchange relationship with walls of said indirect heater to provide cooling to the walls and to utilize heat extracted from the cooling for heat cogeneration.

14. The power plant of claim 1 wherein said closed-cycle gas turbine further comprises a precooler upstream of said compressor.

15. The power plant of claim 14 further comprising a heat cogeneration system in communication with said precooler to utilize the heat extracted from said closed-cycle gas turbine.

16. The power plant of claim 1 further comprising a solid-gas separating cyclone disposed along said first piping to separate the solid particles from the flue gas stream and to direct the solid particles to said indirect heater and to direct the flue gas stream to said open-cycle gas turbine.

17. The power plant of claim 16 further comprising a heat cogeneration system in heat exchange relationship with walls of said solid-gas separating cyclone to provide cooling to the walls and to utilize heat extracted from the cooling for heat cogeneration.

18. The power plant of claim 1 wherein said open-cycle gas turbine further comprises a stack located downstream of said turbine on said first section of said open piping system.

19. The power plant of claim 18 further comprising a heat recovery system located on said first section between said turbine and said stack to utilize the waste heat of the stack flue gas stream prior to emitting the flue gas stream into atmosphere.

20. The power plant of claim 1 wherein said closed-cycle gas turbine further comprises a plurality of compressors.

21. The power plant of claim 20 wherein said closed-cycle gas turbine further comprises intercooling between ones of said plurality of compressors.

22. The power plant of claim 21 further comprising a heat cogeneration system in communication with said intercooling to utilize the heat extracted from said closed-cycle gas turbine.

23. The power plant of claim 1 wherein said open-cycle gas turbine comprises a plurality of compressors.

24. The power plant of claim 23 wherein said open-cycle gas turbine further comprises intercooling between ones of said plurality of compressors.

25. The power plant of claim 24 further comprising a heat cogeneration system in communication with said intercooling to utilize the heat extracted from said open-cycle gas turbine.

26. The power plant of claim 1 wherein said open-cycle gas turbine further comprises a recuperator located downstream of said turbine and said compressor to direct the second working fluid from said compressor in heat exchange relationship with the flue gas stream from said turbine to heat the second working fluid prior to directing the second working fluid to said indirect heater.

27. The power plant of claim 26 further comprising a heat recovery system located downstream of said turbine on said first section of said open piping system whereby the flue gas stream from said turbine is directed to said heat recovery system for heat cogeneration from the flue gas stream.

28. The power plant of claim 27 wherein said open piping system further comprises a bifurcated piping section connected to direct part or all of the flue gas stream to said recuperator and to direct part or all of the flue gas stream to said heat recovery system.

29. The power plant of claim 28 wherein said open piping system further comprises a conduit section between an outlet of said recuperator and an inlet of said heat recovery system to direct part or all of the flue gas stream to said heat recovery system to further recover the heat from the flue gas stream or to control the temperature of said heat recovery system.

30. The power plant of claim 1 wherein said open-cycle gas turbine further comprises a flue gas cooler located in the flue gas stream upstream of said turbine to condense alkali vapor in the flue gas stream.

31. The power plant of claim 30 further comprising a heat cogeneration system in communication with said flue gas cooler to utilize the heat extracted from the flue gas stream in said flue gas cooler.

32. The power plant of claim 30, wherein said closed-cycle gas turbine further comprises a portion of said piping section of said closed piping system located to direct the first working fluid to said flue gas cooler in said open-cycle gas turbine.

33. The power plant of claim 1, wherein said open-cycle gas turbine further comprises a further combustor for heating the flue gas stream to drive said turbine of said open-cycle gas turbine.

34. The power plant of claim 33 further comprising a heat cogeneration system for generating steam and a further piping system connected to direct steam from said heat cogeneration system into said further combustor.

35. The power plant of claim 34 further comprising a water recovery and treatment system located downstream of said open-cycle gas turbine to recover and clean the water content in the exhaust flue gas stream of said open-cycle gas turbine for reuse in said heat cogeneration system.

36. The power plant of claim 33, wherein said open-cycle gas turbine further comprises a portion of said second section of said open piping system located to direct the second working fluid to said further combustor.

37. The power plant of claim 36 wherein said portion of said second section of said open piping system is in heat exchange relationship with the flue gas stream to cool the flue gas stream.

38. The power plant of claim 36 wherein said portion of said second open piping system is in fluid communication with the flue gas stream to mix the second working fluid and the flue gas stream to cool the flue gas stream.

39. The power plant of claim 36 wherein said open-cycle gas turbine further comprises a flue gas cleanup filter located upstream of said further combustor, and said portion of said second section of said open piping system is in heat exchange relationship with said flue gas cleanup filter.

40. The power plant of claim 39 further comprising a heat cogeneration system in heat exchange relationship with walls of said flue gas cleanup filter to provide cooling to the walls and to utilize heat extracted from the cooling for heat cogeneration.

41. The power plant of claim 36 wherein said open-cycle gas turbine further comprises a flue gas cleanup filter located upstream of said further combustor, and said portion of said second section of said open piping system is in fluid communication with the flue gas stream to mix the second working fluid and the flue gas stream to cool the flue gas stream.

42. The power plant of claim 41 further comprising a heat cogeneration system in heat exchange relationship with walls of said flue gas cleanup filter to provide cooling to the walls and to utilize heat extracted from the cooling for heat cogeneration.

43. The power plant of claim 33 further comprising a solid-fuel gasifier for producing a fuel gas and third piping connected to direct the produced fuel gas to said further combustor.

44. The power plant of claim 43 further comprising fourth piping interconnecting said solid-fuel gasifier and said fluidized bed combustor to direct char residue in said solid-fuel gasifier to said fluidized bed combustor for burning.

45. The power plant of claim 43, further comprising a fuel gas cleanup device located along said third piping.

46. The power plant of claim 45 further comprising a heat cogeneration system in heat exchange relationship with walls of said fuel gas cleanup device to provide cooling to the walls and to utilize heat extracted from the cooling for heat cogeneration.

47. The power plant of claim 45, wherein said fuel gas cleanup device further comprises a fuel gas cooler to cool the fuel gas stream in said third piping.

48. The power plant of claim 47 further comprising a heat recovery system in communication with said fuel gas cooler to utilize the heat removed from the fuel gas stream in said fuel gas cooler.

49. The power plant of claim 47, wherein said closed-cycle gas turbine further comprises a portion of said piping section of said closed piping system located to direct the first working fluid to said fuel gas cooler to be used as a coolant.

50. A power plant comprising:
a circulating pressurized fluidized bed combustor having an outlet for a flue gas stream;
a heater located externally of said fluidized bed combustor and in communication with said fluidized bed combustor for receiving solid particles from said outlet of said fluidized bed combustor and for returning fluidized solid particles to said fluidized bed combustor;
an open-cycle gas turbine comprising a compressor for compressing a first working fluid, a turbine, and a generator connected on a common shaft, said open-cycle gas turbine being in fluid communication with said fluidized bed combustor for circulating the flue gas stream from said fluidized bed combustor to said turbine for expansion and for driving said common shaft, said open-cycle gas turbine being in further fluid communication with said heater for directing said first working fluid to said heater to fluidize solid particles therein for return to said fluidized bed combustor; and
a closed-cycle gas turbine comprising a second compressor, a second turbine, and a second generator connected on a second common shaft, and a closed piping system for circulating a second working fluid through said closed-cycle gas turbine, said closed piping system further comprising a piping section located for directing the second working fluid downstream of said compressor to said heater and for returning the second working fluid to said second turbine, whereby the second working fluid on said piping section is heated by heat transfer from the solid particles in said heater.

51. The power plant of claim 50 wherein the second working fluid comprises helium, air, nitrogen, carbon dioxide, or a mixture comprising helium and at least one gas of a heavier molecular weight.

52. The power plant of claim 50 wherein the first working fluid comprises air.

53. The power plant of claim 50 wherein said closed-cycle gas turbine further comprises a recuperator disposed along said piping section of said closed piping system to direct the second working fluid from said second compressor in heat exchange relationship with the second working fluid from said second turbine to heat the second working fluid from said second compressor prior to directing the second working fluid to said heater.

54. The power plant of claim 50 further comprising a heat recovery system in communication with said open-cycle gas turbine downstream of said turbine whereby the flue gas stream from said turbine is directed to said heat recovery system.

55. The power plant of claim 50 further comprising a solid-gas separating cyclone disposed between said fluidized bed combustor and said turbine of said open-cycle gas turbine to separate the solid particles from the flue gas stream and to direct the solid particles to said heater and to direct the flue gas stream to said open-cycle gas turbine.

56. The power plant of claim 50 wherein said open-cycle gas turbine further comprises a flue gas cleanup filter located upstream of said turbine.

57. The power plant of claim 50 wherein said open-cycle gas turbine further comprises a stack located downstream of said turbine.

58. The power plant of claim 50 wherein said open-cycle gas turbine comprises a plurality of compressors.

59. The power plant of claim 58 wherein said open-cycle gas turbine further comprises intercooling between ones of said plurality of compressors.

60. The power plant of claim 59 further comprising a heat cogeneration system in communication with said intercooling from said open-cycle gas turbine.

61. The power plant of claim 50, wherein said open-cycle gas turbine further comprises a further combustor for heating the flue gas stream to drive said turbine of said open-cycle gas turbine.

62. The power plant of claim 61, further comprising a heat cogeneration system in heat exchange relationship with a high temperature portion of the power plant for generating steam, said heat cogeneration system further in fluid communication with said further combustor for injection of the steam into said further combustor.

63. The power plant of claim 62, further comprising a water recovery and treatment system located downstream of said turbine to recover and clean the water content in the flue gas stream of said open-cycle gas turbine for reuse in said heat cogeneration system.

64. The power plant of claim 50 wherein said open-cycle gas turbine further comprises a recuperator located downstream of said turbine and said compressor to direct the first working fluid from said compressor in heat exchange relationship with the flue gas stream from said turbine to heat the first working fluid prior to directing the first working fluid to said heater.

65. The power plant of claim 64, further comprising a heat recovery system located downstream of said turbine to receive the flue gas stream from said turbine for heat cogeneration from the flue gas stream.

66. The power plant of claim 65, wherein said recuperator and said heat recovery system are located in parallel such that selected portions of the flue gas stream are diverted to said recuperator and other selected portions of the flue gas stream are diverted to said heat recovery system.

67. The power plant of claim 66 further comprising a conduit section disposed to direct a further selected portion of the flue gas stream from an outlet of said recuperator to an inlet of said heat recovery system.

* * * * *